3,316,812
APPARATUS FOR ADJUSTING THE DROP OF TOOL HEADS ON MACHINE TOOL SPINDLES
Johann Heinrich Wichern and Alfons Pohlhaus, Dusseldorf, and Otto Ufert, Dusseldorf-Oberkassel, Germany, assignors to Schiess Aktiengesellschaft, Dusseldorf-Oberkassel, Germany
Filed July 27, 1964, Ser. No. 385,151
Claims priority, application Germany, July 30, 1963, Sch 33,641
7 Claims. (Cl. 90—17)

The present invention relates to an apparatus for adjusting the drop of miller or cutter heads on milling spindles, especially of large milling machines which are guided and journalled in the tail spindle or spindle sleeve of the tailstock.

When machining plane surfaces by means of large miller or cutter heads which cut at the end face, it is necessary for obtaining a smooth surface of the work piece that the turning tool does not completely rest on the surface to be machined but that it be slightly lifted off the work piece at that side which is opposite the feeding direction so that the returning miller teeth will be free. To this end, the axis of the working spindle receiving the tool is given an inclined position, the so-called drop, which may amount to up to 0.05 millimeter over a length of 1000 millimeters. With plano-milling or straight-line milling machines it is known to adjust said drop by tilting the headstock. This tilting of the headstock is with heretofore known machines, especially smaller machines, necessary only in one longitudinal direction, i.e. in the direction of movement of the clamping table with work piece on a machine bed or, when the work piece is stationary, in the direction of movement of the miller stand on the bed thereof. The tilting may in this connection be effected in two directions offset with regard to each other by 180° so that it will be possible to mill with a drop during the movement in one direction as well as during the movement in opposite direction.

With large milling machines, for instance machines which are intended for work pieces having a width up to 4 meters and more, generally the milling in one direction is not sufficient because with such work pieces it is frequently necessary to machine surfaces which extend transverse or at an angle to the longitudinal direction. Such machining surfaces are encountered for instance with the supporting or sealing surfaces of the housings of turbines. When such surfaces are milled stripwise in one single direction only, considerable machining time is lost in view of the spotting and the moving out of the miller head. In view thereof, it is necessary that the machine be able to mill not only in the longitudinal direction but also transverse and at an angle thereto. This is made possible by simultaneously making effective the longitudinal and the transverse advance.

Experience has shown that the heretofore known adjusting possibilities for the drop do not meet this requirement. Aside from the fact that a drop adjustment by correspondingly tilting the headstock in longitudinal direction or transverse thereto does not cover a possible advance at an angle, it is for all practical purposes impossible with large machines to tilt the headstock with the necessary precision to the required extent.

Based on this state of the art and on the above-mentioned findings, it is an object of the present invention to provide an apparatus for adjusting the drop of milling and cutter heads of milling spindles, especially of large milling spindles, which are guided and journalled in the tail spindle or spindle sleeve of the headstock, which will make it possible to adjust the drop in any direction.

It is also an object of this invention to provide an apparatus for adjusting the drop of tool heads guided and journalled in the tail spindle or spindle sleeve of a spindle head which may be employed in connection with gear shapers and gear shaving machines.

These and other objects and advantages of the invention will appear more clearly from the following specification in connection with the accompanying drawings, in which.

Figure 1:
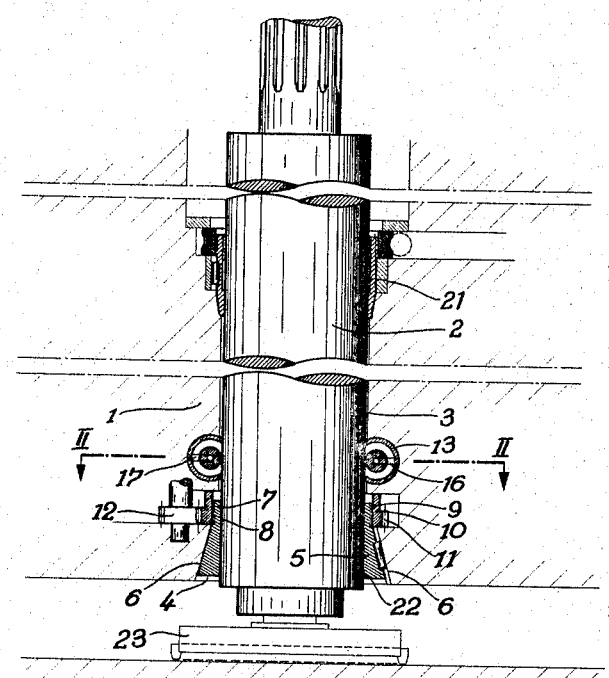
FIG. 1 is a central longitudinal section through an embodiment according to the present invention, the spindle sleeve with tool being shown in elevation.

The problem underlying the present invention has been solved by making the spindle sleeve adjustable so as to produce a drop in any direction transverse to the spindle axis. Due to the fact that only the spindle sleeve or the head spindle is able to carry out a tilting movement, the headstock may remain unchanged with regard to its guiding means, and relatively low forces suffice for the tilting operation to produce the drop. In addition thereto, it is possible with highest precision to adjust the spindle sleeve with the miller spindle and the milling or cutting head to the desired drop. "Drop," as used herein means movement lateral to the axis of the spindle sleeve.

In connection with a lathe it has been suggested to make the bearings for the spindle tiltable about a common point in order to be able by tilting the bearings to adjust the spindle position so that a precise parallel position will be obtainable with regard to the respective guiding means for the headstock, carriage or the like, which parallel position might otherwise not be possible without adjusting of the bearing means because a lathe is composed of a plurality of parts so that errors in manufacture would add up. This heretofore known adjusting device, however, has no relationship to the adjustment of a drop which has continuously to be adapted to the requirements of the respective machining operations and therefore must be easy to operate. The above-mentioned heretofore known adjusting apparatus is not applicable for adjusting the drop because it requires a change of the position of two spindle bearings, and such change is obtainable only by loosening and again tightening both bearing heads.

According to a further development of the present invention, the means for adjusting and arresting the spindle sleeve may be arranged at the tool end of the tool spindle, i.e. where those portions are located which are easily accessible to the operator.

The adjusting and arresting in any desired direction may in conformity with the present invention be made possible by making the adjusting means of at least four pairs of clamping bushings which are evenly distributed over the circumference of the tool spindle and each of which comprises two pot-shaped bushings. These pairs of clamping bushings have one portion of the circumference thereof adapted to the diameter of the tool spindle. These pot-shaped bushings are surrounded by a cylinder and have their inside closed by a stud. The chambers formed by the cylinder and the clamping bushings and the chambers between the clamping bushings and the studs are accessible to an actuating fluid through openings. Such actuating means makes it possible to adjust the clamping bushings in conformity with the required tilting of the tool spindle to thereby adjust the drop.

The arrangement according to the present invention may also be employed in connection with the machining of gears. This finding according to the present invention is based on the fact that the rotatable pushrod of a gear shaper and gear shaving machine, which carries the cutting wheel and is axially displaceable in the tool spindle, is during the cutting or shaving operation, in view of the radially effective pressure forces, subjected to radial deviations at its guiding means so that the pushing and shaving direction is not always parallel to the axis of the work piece but frequently extends at an angle thereto. As a result thereof, gears are obtained which do not carry over the full width of the teeth but only at one end. This brings about an uncalculable increase in the tooth load and consequently a premature wear and frequently even causes the tooth to break. If, however, the apparatus according to the present invention is employed, it is possible by a corresponding drop adjustment in advance to consider the deviation of the pushrod as a result of the bending forces occurring during the cutting operation so that precisely machined cylindrical gears can be produced.

A further advantage of the application of the drop adjustment according to the present invention to gear shapers and gear shaving machines consists in that it maes it possible to produce gears which heretofore could be produced only by the employment of special devices. In particular, the employment of the apparatus according to the present invention in connection with gear shapers and gear shaving machines makes possible the production of gears in which the flank sections located near the outer zones of the gears are of a conical shape whereby a smooth running of the gears will be obtained which heretofore was obtainable only by spherical milling, smoothing or shaving.

*Structural arrangement*

Figure 2:
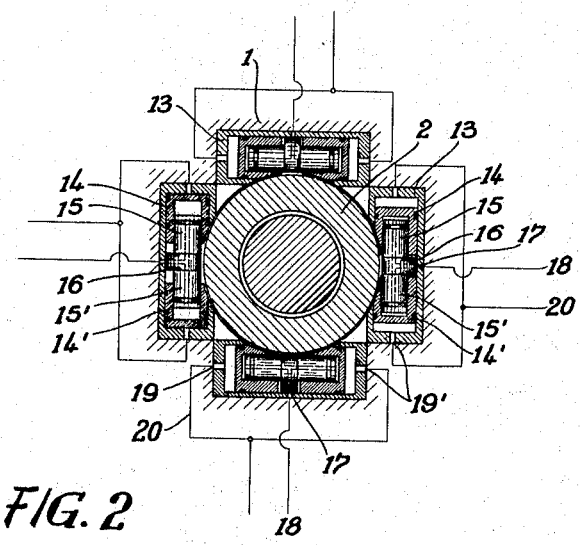
FIG. 2 is a section taken along the line II—II of FIG. 1.

Referring now to the drawing in detail and FIGS. 1 and 2 thereof in particular, these figures show a head stock 1 of a milling machine with a bore 3 for a tool spindle 2. Where tool spindle 2 protrudes from head stock 1, bore 3 is provided with a conical bore section 4. Inserted into said conical bore section 4 is a bearing bushing 5 which is slit in axial direction thereof and directly and coaxially surrounds tool spindle 2. The conical outer surface of bushing 5 is coaxial with the bore of said bushing 5. At the inner tapering end of bushing 5, the latter has a cylindrical extension 7 with an outer thread 8 which meshes with the inner thread 9 of a nut 10 which latter has its outer periphery provided with a gear ring 11. Gear ring 11 meshes with a pinion 12 journalled in head stock 1 and adapted to be turned manually and mechanically in any convenient manner.

Directly adjacent bearing bushing 5 which serves for adjusting the magnitude of the drop, there are provided arresting means for tool spindle 2. These arresting means comprise four cylinders 13 substantially uniformly distributed over the circumference of the tool spindle. Each of said cylinders 13 has displaceably arranged therein two clamping bushings 14, 14' which form pistons and are displaceable in longitudinal direction of the respective cylinder 13. The clamping bushings 14, 14' are pot-shaped and are so arranged in their respective cylinder 13 that the open ends of said clamping bushings face each other. One portion of the circumference of said clamping bushings is so adapted to the diameter of the tool spindle that when the respective clamping bushings in one and the same cylinder move toward each other they will engage the tool spindle and displace and clamp the same. The cylinder-shaped cavities of clamping bushings 14, 14' are sealingly engaged by studs 15, 15'. Said studs 15, 15' preferably form a single piece so as to represent a rigid part and have their central peripheral portion provided with a protrusion 16 which extends up to the inner wall of the respective cylinder 13 and is non-displaceably connected to cylinder 13. A bore 17 extending through cylinder 13 and studs 15, 15' divides approximately in the central portion of stud 15, 15' and leads to the end faces thereof. Bore 17 has connected thereto a conduit 18 for connection with a pressure fluid medium. Such pressure fluid medium may pass through the branch lines of bore 17 into the chambers between studs 15, 15' and the pot-shaped clamping bushings 14, 14' whereby said bushings will be moved away from each other. The end faces of cylinders 13 are provided with bores 19, 19' having connected thereto a conduit 20. When a pressure fluid medium passes through conduit 20 and bores 19, 19' into cylinder 13, the end faces of clamping bushings 14, 14' will be actuated and the clamping bushings will be moved toward each other. Each of the four arresting devices may be controlled by valves (not shown in the drawing) with regard to the arresting force and also with regard to the force for withdrawing the clamping bushings. By having each of the four arresting devices equipped with a valve of its own, each of the arresting forces can be controlled individually. The drive end of tool spindle 2 is in customary manner journalled in an adjustable bearing bushing 21.

*Operation of embodiment of FIGS. 1 and 2*

When a drop of any desired magnitude is to be adjusted, it is necessary by turning pinion 12 and nut 10 to loosen the bearing bushing 5 which determines the central location of the tool spindle. When such loosening operation is being carried out, the axially slit bearing bushing 5 spreads and increases its inner diameter thereby freeing the spindle tool 2 so that the latter can escape to a minor extent in a direction perpendicular to its longitudinal axis. Tool spindle 2 can escape all the more the farther the bearing bushing 5 is moved out of the conical bore in which it is located and the inner diameter of bushing 5 can spread accordingly.

The tool spindle 2 is now inclined or adjusted as to its drop by actuating one or two arresting devices. If it is desired to incline the tool spindle in one of the four directions which are perpendicular to the longitudinal axes of the individual clamping cylinders 13, first the arresting device arranged in the desired drop direction is actuated, whereupon the three other devices are tightened for safely holding and clamping the tool spindle. If the drop is to be adjusted in further directions which are located between the just mentioned directions, it is necessary simultaneously to actuate two adjacent arresting devices before the other two adjusting devices are to be subjected to the action of a pressure medium for clamping the tool spindle. FIG. 1 shows the drop position of tool spindle 2 as brought about by one arresting device so that between tool spindle 2 and the bearing bushing 5, an air gap 22 is formed and the tool 23 is inclined.

It is, of course, to be understood that the present invention is, by no means, limited to the particular constructions and arrangements shown in the drawings but also comprises any modifications within the scope of the appended claims.

What is claimed is:

1. In a machine tool; spindle means round in cross section and having a longitudinal axis and also having means at one end for receiving a cutting tool, spindle support means also having an axis, guide means disposed between said support means and said spindle means for supporting the spindle means and including adjusting means, and means for actuating said adjusting means for adjusting said spindle means to obtain a condition of angularity of said axes relative to each other, said adjusting means being near said one end of said spindle means whereby the said adjusting of the spindle means results in movement of a tool thereon in a direction laterally of the said support means axis, said adjusting means comprising reciprocable clamping bushing means extending about the circumference of said spindle means and moveable in one direction to exert a thrust laterally on said spindle means and moveable in the other direction to retract from the spindle means, and means for selectively actuating said bushing means to produce lateral movement of said spindle means in said support means in any desired direction.

2. In a machine tool; spindle means round in cross section and having a longitudinal axis and also having means at one end of receiving a cutting tool, spindle support means also having an axis, guide means disposed between said support means and said spindle means for supporting the spindle means and including adjusting means, and means for actuating said adjusting means for adjusting said spindle means to obtain a condition of angularity of said axes relative to each other, said adjusting means being near said one end of said spindle means whereby the said adjusting of the spindle means results in movement of a tool thereon in a direction laterally of the said support means axis, said adjusting means comprising a plurality of pairs of clamping bushings uniformly distributed about the circumference of said spindle means and extending in a direction substantially tangential to the spindle means while overlapping the spindle means, the bushings of each pair being moveable in a first direction toward each other to engage the spindle means and exert a lateral thrust thereon in a direction at right angles to the tangential direction pertaining to the respective pair of bushings and being moveable in a second direction away from each other to retract from said spindle means, and actuating means for effecting the selective actuation of the respective pairs of bushings in said first and second directions.

3. A machine tool according to claim 2 wherein each said bushing has the end thereof adjacent the spindle means and on the side toward the spindle means arcuately beveled so as to conform with the shape of the outer surface of the spindle means.

4. A machine tool according to claim 3 wherein cylinder means is provided in the support means for receiving each pair of bushings, each said bushing being cup-shaped with its open end toward the other bushing of the pertaining pair, stud means in the center of each cylinder means having piston portions extending into the pertaining bushings, and said actuating means including, fluid connections to the opposite ends of said cylinder means and also through said stud means to the ends of the said piston portions thereof whereby movement of said bushings can be accomplished by a supply of fluid under pressure to respective ones of said fluid connections.

5. A machine tool according to claim 2 in which said guide means including guide bushings provided between said spindle means and said spindle support means near the opposite ends of said support means, and means for selectively adjusting at least one of said guide bushings from a first position wherein said spindle means in said support means with the spindle means axis fixed into a second position wherein said spindle means is free to be adjusted laterally in said support means by said pairs of bushings.

6. A machine tool according to claim 5 wherein said guide bushings are conical on the outside and said support means includes conical seats for receiving said guide bushings, and means for effecting axial movement of the guide bushings toward and away from said seats.

7. A machine tool according to claim 5 wherein said guide bushings are conical on the outside and said support means includes conical seats for receiving said guide bushings, a ring gear in the support means adjacent each guide bushing screw threadedly connected to the pertaining guide bushing, means for rotating said ring gears to move the guide bushings toward and away from their respective seats, and each guide bushing being axially split so as to retract from the spindle means when retracted from its seat while closing about the spindle means when advanced into its seat.

References Cited by the Examiner

UNITED STATES PATENTS

| | | | |
|---|---|---|---|
| 920,859 | 5/1909 | Gardner | 90—17 X |
| 1,047,493 | 12/1912 | Bryant | 90—17 X |
| 1,820,409 | 8/1931 | Trbojevich | 90—7 |
| 2,364,065 | 12/1944 | Frederichs | 90—7 |
| 2,374,928 | 5/1945 | Frauenthal et al. | 90—17 X |
| 3,192,834 | 7/1965 | Laine | 90—17 X |

WILLIAM W. DYER, Jr., *Primary Examiner.*